(12) United States Patent
Iwashita et al.

(10) Patent No.: US 7,791,305 B2
(45) Date of Patent: Sep. 7, 2010

(54) CONTROL APPARATUS OF SERVO MOTOR

(75) Inventors: Yasusuke Iwashita, Yamanashi (JP);
Tadashi Okita, Yamanashi (JP);
Hiroyuki Kawamura, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 316 days.

(21) Appl. No.: 12/007,945

(22) Filed: Jan. 17, 2008

(65) Prior Publication Data
US 2008/0180052 A1 Jul. 31, 2008

(30) Foreign Application Priority Data
Jan. 29, 2007 (JP) .............. 2007-017824

(51) Int. Cl.
*G05B 11/32* (2006.01)

(52) U.S. Cl. ............ 318/625; 318/601; 318/602

(58) Field of Classification Search ............ 318/625, 318/601, 602, 632, 609, 610
See application file for complete search history.

(56) References Cited

U.S. PATENT DOCUMENTS

| | | | | |
|---|---|---|---|---|
| 5,304,905 | A * | 4/1994 | Iwasaki | 318/561 |
| 5,404,418 | A | 4/1995 | Nagano | |
| 6,204,622 | B1 * | 3/2001 | Tsuruta | 318/609 |
| 6,469,467 | B1 | 10/2002 | Fujita | |
| 6,515,442 | B1 * | 2/2003 | Okubo et al. | 318/560 |
| 6,774,598 | B1 | 8/2004 | Kohler et al. | |
| 6,823,235 | B2 * | 11/2004 | Toyozawa et al. | 700/193 |
| 2004/0183494 | A1 | 9/2004 | Nagaoka et al. | |
| 2005/0129794 | A1 * | 6/2005 | Chao | 425/145 |
| 2006/0138990 | A1 * | 6/2006 | Ide | 318/609 |
| 2007/0006630 | A1 * | 1/2007 | Iwashita et al. | 72/351 |

FOREIGN PATENT DOCUMENTS

| | | |
|---|---|---|
| DE | 10043636 A1 | 3/2001 |
| EP | 1120698 A1 | 8/2001 |
| EP | 1437637 A2 | 1/2004 |
| JP | 7-123762 | 5/1995 |
| JP | 2504307 | 4/1996 |
| JP | 9-282008 | 10/1997 |
| JP | 2004-272883 | 9/2004 |

OTHER PUBLICATIONS

Japanese Notice of Reasons for Rejection mailed Jun. 17, 2008 issued in Japanese Application No. 2007-017824 (including a partial translation thereof).
European Search Report mailed Jun. 5, 2008 issued in European Application No. 07025053.5.

* cited by examiner

*Primary Examiner*—Rina I Duda
(74) *Attorney, Agent, or Firm*—Drinker Biddle & Reath LLP (57) ABSTRACT

The control apparatus 10 of a servo motor of the present invention has a position control unit 11 controlling the position of a servo motor 33, a speed control unit 12 controlling a speed of the servo motor 33, a distributing unit 13 dividing the speed command output by the position control unit 11 into a filtered part Vf which is filtered to suppress vibration and a nonfiltered part Vnf, a filtering unit 14 receiving as input the filtered part Vf and filtering and outputting the filtered part Vf, and an adder unit 15 adding the filtered part Vf filtered by the filtering unit 14 and the nonfiltered part Vnf and outputting the result to the speed control unit 12.

11 Claims, 10 Drawing Sheets

CONTROL APPARATUS OF SERVO MOTOR

The applicant claims the right to priority based on Japanese Patent Application No. 2007-017824, filed on Jan. 29, 2007. The entire content of Japanese Patent Application No. 2007-017824 is hereby incorporated by reference.

FIELD OF THE INVENTION

The present invention relates to a control apparatus of a servo motor, more particularly relates to a control apparatus of a servo motor suppressing vibration due to resonance in a mechanical system comprised of a servo motor and a driven part driven by this servo motor.

BACKGROUND OF THE INVENTION

In the past, control apparatuses of servo motors have been used in machine tools and industrial machines. In particular, the control apparatus of a servo motor using feedback control performs control so that the differences between the position, speed, current, and other command values and actual values always become zero, so the machine position, motor speed, etc. are accurately controlled and therefore is being broadly employed in general CNC machine tools etc.

On the other hand, the mechanical system comprised of a servo motor and a driven part driven by this servo motor is a physical dynamic system having elasticity, friction, mass, etc. When the rigidity or attenuation characteristics are low, sometimes there is mechanical resonance.

Therefore, control apparatuses for motors for suppressing vibration due to such mechanical resonance are being proposed. For example, Japanese Patent No. 2504307 discloses a speed control apparatus of an electric motor provided with a filter to be inserted in a torque command in a speed feedback control loop in a mechanical system comprised of an electric motor and a load driven by this electric motor, where this filter limits the passage of a frequency component due to mechanical resonance between the electric motor and load included in the speed detection value of the mechanical system.

Further, Japanese Patent Publication (A) No. 2004-272883 discloses a servo control apparatus provided with a mechanical property compensating unit attenuating a predetermined frequency component corresponding to a characteristic of the machine to be driven from a position command signal so as to calculate the position, speed, and torque feedforward signals and a feedback compensating unit driving the machine to be driven in accordance with the position, speed, and torque feedforward signals calculated by the mechanical property compensating unit. In this control apparatus of a servo motor, the mechanical property compensating unit is provided with a torque command calculating unit attenuating the resonance frequency component of the machine to be driven and calculating a torque feedforward signal.

In the speed control apparatus of an electric motor described in Japanese Patent No. 2504307, the mechanical resonance frequency of the mechanical system is in a frequency region higher than the frequency band of the gain of the transfer function of this speed control apparatus.

Further, in the servo control apparatus described in Japanese Patent Publication (A) No. 2004-272883, a filter for attenuating the mechanical resonance frequency component of the machine to be driven is provided in the calculating unit of the torque command signal of a motor for calculating the torque feedforward signal.

In this way, when the mechanical resonance frequency of the mechanical system is relatively high, as shown in Japanese Patent No. 2504307 and Japanese Patent Publication (A) No. 2004-272883, it is possible to suppress vibration due to mechanical resonance by providing a filter for the torque command signal of the servo motor.

However, sometimes the mechanical resonance frequency of a mechanical system is a low frequency overlapping the frequency band of the gain of a transfer function of the control apparatus of a servo motor, that is, a low frequency where the speed control can sufficiently react. In this case, in the control apparatus of Japanese Patent No. 2504307 or Japanese Patent Publication (A) No. 2004-272883, either the vibration due to mechanical resonance cannot be sufficiently suppressed or the precision of the position to be controlled ends up falling, so the precision of work of the machine tool etc. is liable to fall.

For example, in a machine tool operating with a plurality of axes in cooperation, mechanical resonance of such a low frequency occurs. In this case, if applying the filter of Japanese Patent No. 2504307 or Japanese Patent Publication (A) No. 2004-272883 to the position commands of the axes and the speed commands of the axes arising from the same, the path resulting from the combination of the paths of the plurality of axes may greatly deviate from the composite path of the position commands.

Further, in a machine tool, when applying a filter to the feed shaft where low frequency mechanical resonance occurs so as to suppress such vibration, the work results may deteriorate due to the effect of the control delay of the operating shafts at locations of sharp angle operation and locations of high acceleration. In this way, if simply filtering the position command or speed command, sometimes speed commands required for acceleration or deceleration of the motor are not sufficiently output. As a result, the work precision of machine tools etc. is liable to deteriorate.

Further, if lowering the frequency band of the gain of the transfer function in the control apparatus of a servo motor below the frequency of the mechanical resonance to avoid this low frequency vibration, the dynamic characteristics of the mechanical system end up falling.

SUMMARY OF THE INVENTION

Therefore, the present invention provides a control apparatus of a servo motor suppressing the mechanical resonance due to the low frequency vibration of a mechanical system comprised of a servo motor and a driven part driven by this servo motor and superior in control precision.

To solve the problems, the aspect of the invention as set forth in claim 1 is a control apparatus of a servo motor comprising a position control unit for controlling a position of a servo motor, a speed control unit for controlling a speed of the servo motor, a distributing unit for dividing a speed command output by the position control unit into a filtered part to be filtered for suppressing vibration and a nonfiltered part, a filtering unit for receiving as input the filtered part and filtering and outputting the filtered part, and an adder unit for adding the filtered part filtered by the filtering unit and the nonfiltered part and outputting the result to the speed control unit.

Further, the aspect of the invention as set forth in claim 2 preferably further comprises a higher control unit for outputting a position command and a position detection unit for detecting the position of the servo motor and outputting the position detection value, wherein the position control unit includes a first position control unit and a second position control unit, a first speed command found in accordance with a differential value of the position command is output from the first position control unit to which the position command is input to the distributing unit, a second speed command is output from the second position control unit to which a positional difference obtained from the position command and the position detection value is input, and the adder unit adds the filtered part of the first speed command filtered by the filtering unit and the nonfiltered part of the first speed command together with the second speed command and outputs the result to the speed control unit.

Further, in the aspect of the invention as set forth in claim 3, the second speed command is filtered by the filtering unit.

Further, in the aspect of the invention as set forth in claim 4, the first speed command is the differential value of the position command multiplied with a first processing constant and the second speed command is the positional difference multiplied with a second processing constant.

Further, in the aspect of the invention as set forth in claim 5, the nonfiltered part is the first speed command multiplied with a third processing constant k and the filtered part is the first speed command multiplied by (1−k).

Further, in the aspect of the invention as set forth in claim 6, the filtering unit can change an input/output gain without changing the frequency band by changing a filter constant of the filter. Further, the aspect of the invention as set forth in claim 6 is preferably applied to a control apparatus of a servo motor in which the filter is a bandstop filter.

Further, in the aspect of the invention as set forth in claim 8, the apparatus further has a changing unit changing the third processing constant or the filter constant. Further, the aspect of the invention as set forth in claim 8 is preferably applied to a control apparatus of a servo motor in which the third processing constant or the filter constant is changed by the changing unit in accordance with a maximum acceleration at the time of acceleration/deceleration by the position command or an acceleration/deceleration time constant applied by acceleration/deceleration.

Further, in the aspect of the invention as set forth in claim 10, the apparatus further comprises a working unit driven by the servo motor and the third processing constant is switched by the changing unit when the position command instructs working by the working unit and when it instructs movement of the working unit not accompanied by working.

Further, in the aspect of the invention as set forth in claim 11, the apparatus further comprises a working unit driven by the servo motor and the filter constant is switched by the changing unit when the position command instructs working by the working unit and when it instructs movement of the working unit not accompanied by working.

The terms used in the claims are not limited to the specific meanings described in the specification (for example, the embodiments).

According to the control apparatus of a servo motor of the present invention, the mechanical system comprised of a servo motor and a driven part driven by this servo motor is suppressed in mechanical resistance due to low frequency vibration and superior in control precision.

DESCRIPTION OF THE DRAWINGS

These and other features and advantages of the present invention will be better understood by reading the following detailed description taken together with the drawings wherein.

DESCRIPTION OF THE PREFERRED EMBODIMENTS

Below, a control apparatus of a servo motor of the present invention will be explained with reference to the drawings. However, note that the present invention is not limited by the following explanation and that it extends to the aspects of the invention described in the claims and their equivalents.

Figure 1:
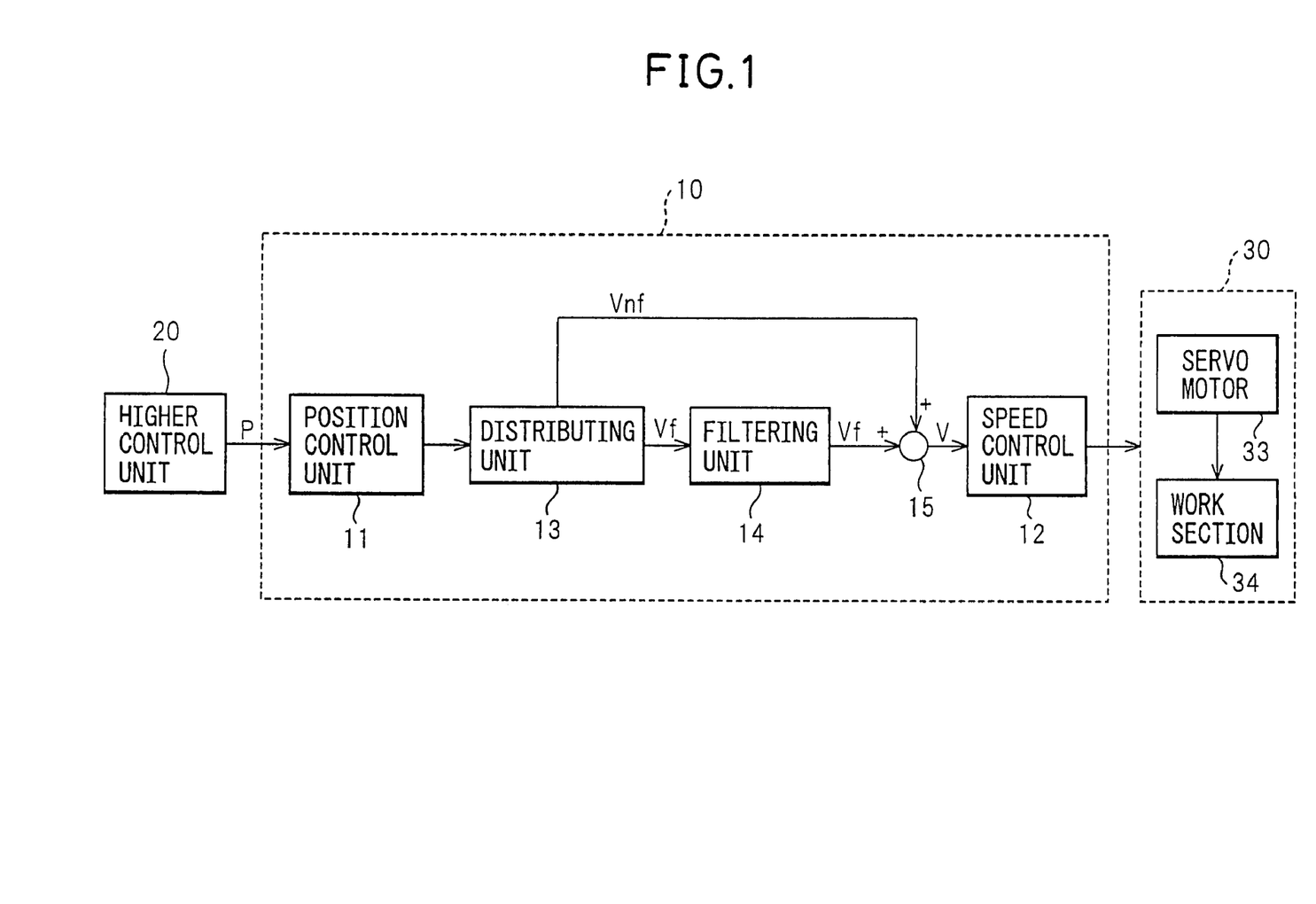
FIG. 1 is a block diagram for explaining a control apparatus of a servo motor of the present invention.

First, the basic configuration of the present invention will be explained. FIG. 1 shows the basic configuration of the control apparatus of a servo motor of the present invention as a block diagram.

A control apparatus 10 of a servo motor of the present invention, as shown in FIG. 1, receives a position command P from a higher control unit 20, drives a servo motor 33 in a working unit 30, and drives the driven part, that is, a work section 34, to control its operations.

Specifically, the control apparatus 10 of a servo motor of the present invention, as shown in FIG. 1, has a position control unit 11 controlling a position of the servo motor 33 and a speed control unit 12 controlling a speed of the servo motor 33. Further, the control apparatus 10 has a distributing unit 13 for dividing a speed command output by the position control unit 11 into a filtered part Vf to be filtered for suppressing vibration and a nonfiltered part Vnf, a filtering unit 14 receiving as input the filtered part Vf and filtering the filtered part Vf, and an adder unit 15 adding the filtered part Vf filtered by the filtering unit 14 and the nonfiltered part Vnf and outputting the result to the speed control unit 12.

The working unit 30 forms a mechanical system comprised of the servo motor 33 controlled in operation by the control apparatus 10 and the driven part driven by this servo motor 33. This mechanical system has mechanical resonance. The mechanical resonance frequency fc is a low frequency overlapping with the frequency band of the gain of the transfer function of the control apparatus of a servo motor.

The control apparatus 10 of a servo motor of the present invention shown in FIG. 1 will be explained in detail below. First, the higher control unit 20 outputs a position command P to the control apparatus 10 of a servo motor of the present invention. This higher control unit 20 is for example a control unit controlling a machine tool, industrial machine, etc. A CNC control apparatus or other known control apparatus can be used.

The position control unit 11 receives as input the position command P output from the higher control unit 20 and outputs a speed command for controlling the position of the servo motor 33 to the distributing unit 13 so as to follow this position command P.

The distributing unit 13 receives as input the speed command output from the position control unit 11 and outputs this speed command divided into a filtered part Vf for filtering to suppress vibration due to the mechanical resonance of the working unit 30 and the nonfiltered part Vnf not for filtering.

If filtering all speed commands output by the position control unit 11 to suppress vibration due to the mechanical resonance of the working unit 30, sometimes the speed commands required for acceleration or deceleration of the servo motor 33 are not sufficiently output. As a result, the work precision at the working unit 30 is liable to deteriorate. Therefore, the ratio of filtering the speed commands can be adjusted by the distributing unit 13 in accordance with the operation of the working unit 30 and content of the position command P etc., whereby the work precision is secured and vibration due to mechanical resonance is suppressed.

The filtering unit 14 receives as input the filtered part Vf of the speed command output from the distributing unit 13 and removes the mechanical resonance frequency component from this filtered part Vf. On the other hand, the filtering unit 14 passes the frequency components of the control apparatus 10 other than this mechanical resonance frequency component. As a result, the filtered part Vf output from the filtering unit 14 preferably does not include any component causing vibration due to resonance in the working unit 30.

The nonfiltered part Vnf of the speed command and the filtered part Vf filtered by the filtering unit 14 divided by the distributing unit 13 are input to the adder unit 15 where they are added to become the speed command V. This speed command V is output from the adder unit 15 to the speed control unit 12.

The speed control unit 12 receives as input the speed command V output from the adder unit 15 and outputs a current command for controlling the speed of the servo motor 33 and other commands for controlling the servo motor 33 in accordance with this speed command V to the working unit 30.

The servo motor 33 of the working unit 30 receives as input the control command output from this speed control unit 12 and operates in accordance with this control command. As a result, the operation of the work section 34 driven by the servo motor 33 is controlled.

As the above-mentioned working unit 30, for example, known mechanical components of machine tools, industrial machines, etc. may be mentioned. Specifically, as the working unit 30, mechanical components of end mills and other machining centers provided with work sections may be mentioned. The control apparatus 10 of a servo motor of the present invention can be used for control of the feed shaft of this mechanical component. Alternatively, as the working unit 30, a transport use belt conveyor may be mentioned. The control apparatus 10 of a servo motor of the present invention can also be used for control of the feed shaft of this belt conveyor.

Below, the control apparatus of a servo motor of the present invention will be explained based on preferred embodiments while referring to this drawing. Note for points not particularly explained, the above-mentioned explanations may be suitably applied. Further, components the same as in FIG. 1 are assigned the same reference notations.

First Embodiment

Figure 2:
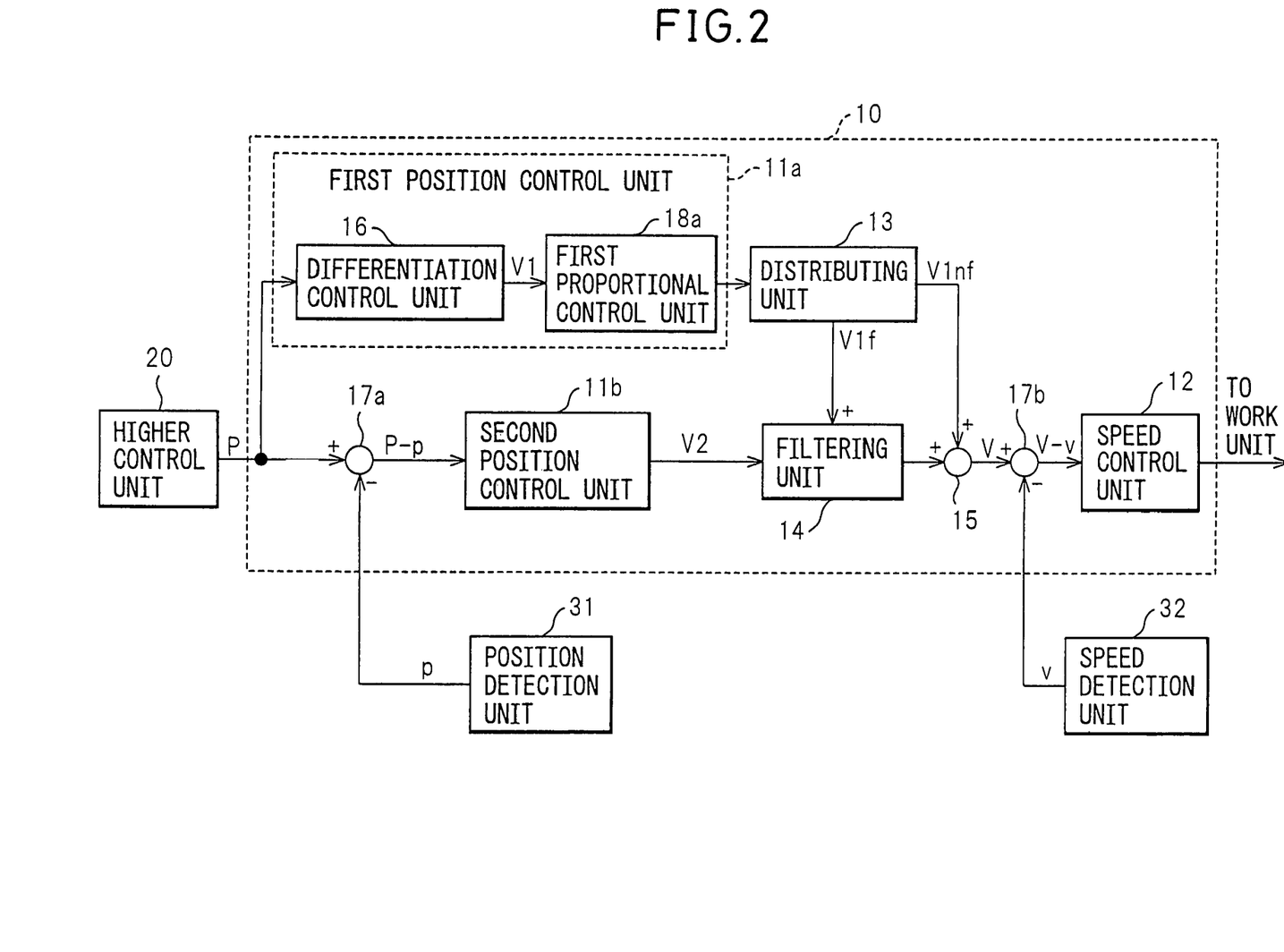
FIG. 2 is a block diagram showing principal parts of a control apparatus of a servo motor of a first embodiment of the present invention.
Figure 3:
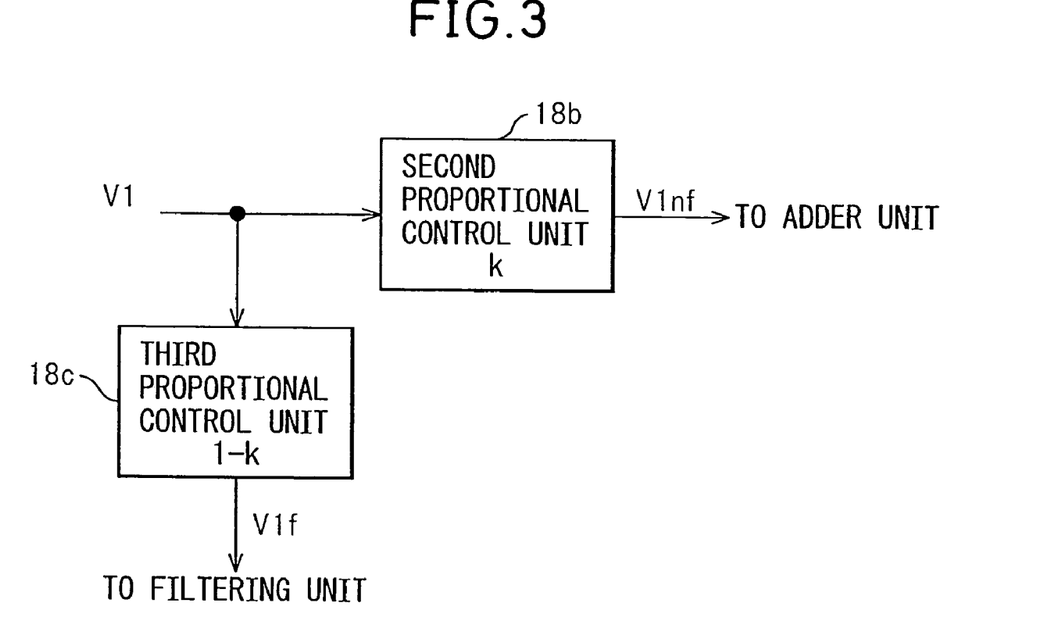
FIG. 3 is a block diagram for explaining a distributing unit of FIG. 2.
Figure 4:
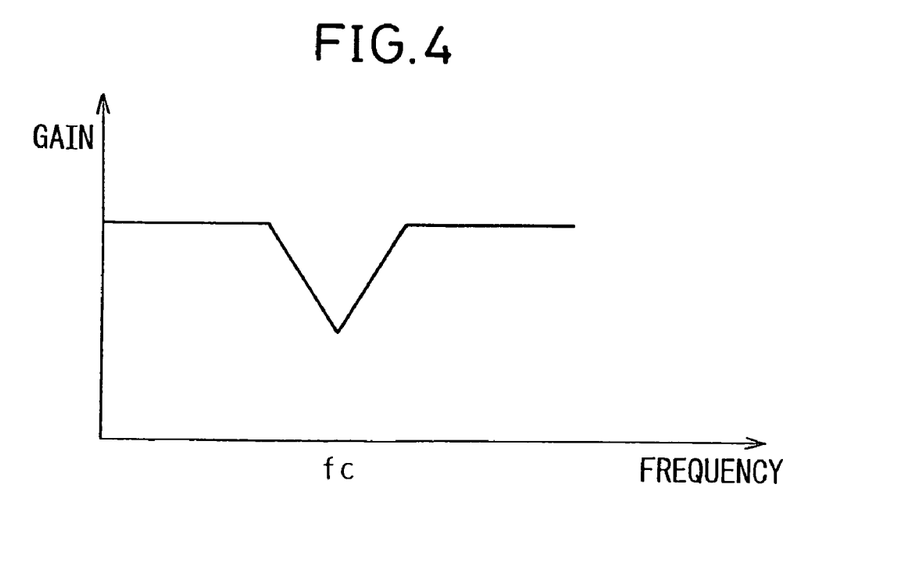
FIG. 4 is a view for explaining a filtering unit of FIG. 2.

The control apparatus 10 of a servo motor of a first embodiment of the present invention (hereinafter also referred to simply as the "apparatus 10"), as shown in FIGS. 2 to 4, has the position control unit 11 controlling the position of the servo motor 33 and the speed control unit 12 controlling the speed of the servo motor 33.

Further, the apparatus 10 has the higher control unit 20 outputting a position command P and the position detection unit 31 detecting the position of the servo motor 33 and outputting the position detection value p. The first position control unit 11a to which the position command P is input outputs the first speed command V1 found in accordance with the differential value of the position command P to the distributing unit 13. Further, the second position control unit 11b to which the positional difference P-p obtained from the position command P and the position detection value p is input outputs a second speed command V2.

Further, the adder unit 15 of the apparatus 10 adds the filtered part V1f of the first speed command V1 filtered by the filtering unit 14, the nonfiltered part V1nf of the first speed command V1, and the second speed command V2 and outputs the result to the speed control unit 12.

The working unit 30 of the apparatus 10, for example, is comprised of the servo motor 33 and the work section 34 coupled by a torque transmission mechanism. Further, the working unit 30, as shown in FIG. 2, is provided with the position detection unit 31 for detecting the position of the servo motor 33 and the speed detecting unit 32 for detecting the speed of the servo motor 33. Further, the speed control unit 12 and the servo motor 33 may have a current control unit controlling the current command output to this servo motor 33 inserted between them.

The actual position p of the servo motor 33 output from this position detection unit 31 is input to the first subtracting unit 17a. Further, the actual speed v of the servo motor 33 output from the speed detecting unit 32 is input to the second subtracting unit 17b. Note that for the working unit 30, in FIG. 2, only the position detection unit 31 and speed detecting unit 32 are described.

The apparatus 10 shown in FIG. 2 will be explained in detail below. The position control unit of the apparatus 10, as shown in FIG. 2, is comprised of a first position control unit 11a and a second position control unit 11b. The position command P output from the higher control unit 20 is branched and input to the first position control unit 11a and, through the first subtracting unit 17a, to the second position control unit 11b. In the apparatus 10, the first position control unit 11a forms a feedforward control unit, while the second position control unit 11b forms a feedback control unit.

The first position control unit 11a receives as input the position command P from the higher control unit 20 and outputs the first speed command V1 so that the position of the servo motor 33 is controlled in accordance with this position command P. This first position control unit 11a is comprised of a differentiation control unit 16 and first proportional control unit 18a. In the apparatus 10, the differentiation control unit 16 differentiates the position command P and outputs the differentiated position command P as the first speed command V1 to the first proportional control unit 18a.

The first proportional control unit 18a multiplies the first speed command V1 output from the differentiation control unit 16 with the first processing constant and outputs this first speed command V1 multiplied with the first processing constant to the distributing unit 13.

The distributing unit 13 divides the first speed command V1 output from the first proportional control unit 18a into the filtered part V1f to be filtered to suppress vibration due to the mechanical resonance of the working unit 30 and the nonfiltered part V1nf.

The distributing unit 13 of the apparatus 10 will be explained below using the example of FIG. 3. The distributing unit 13 is comprised of a second proportional control unit 18b and a third proportional control unit 18c. The first speed command V1 multiplied with the first processing constant output from the first position control unit 18a is branched and input to the second proportional control unit 18b and third proportional control unit 18c. In the second proportional control unit 18b, the first speed command V1 multiplied with the first processing constant is multiplied with a third processing constant k and output as the nonfiltered part V1nf to the adder unit 15.

On the other hand, in the third proportional control unit 18c, the first speed command V1 multiplied with the first processing constant is multiplied with (1−k) and output as the filtered part V1f to the filtering unit 14. This third processing constant k has a value of 0 to 1 and preferably can be changed in accordance with the operation of the working unit 30 and the content of the position command P etc.

The filtering unit 14 removes the mechanical resonance frequency component from the filtered part V1f input in the above way.

Explaining this filtering unit 14 using the example of FIG. 4, the filtering unit 14 of the apparatus 10 is a bandstop filter able to change the input/output gain of the transfer function of the filtering unit 14 by changing the filter constant g of the filter without changing the frequency band. An example of the gain characteristics of the transfer function of this bandstop filter is shown in FIG. 4. This filter constant g further preferably can be changed in accordance with the operation of the working unit 30 and the content of the position command P etc.

Specifically, the bandstop filter of the filtering unit 14 is expressed by for example the transfer function F(s) of the following equation:

$$F(s)=(s^2+2g\omega s+\omega^2)/(s^2+2\tau\omega s+\omega^2)$$

where, s is an argument of an exponential function in a Laplace transform, that is, a coefficient of time, $\omega=2\pi fc$, fc is the center frequency of the cutoff band (Hz) (see FIG. 4), $\tau=fw/fc$, fw is the cutoff bandwidth (Hz), $g=\sigma\tau$, and $\sigma$ is a damping coefficient (0 to 1).

This bandstop filter is set so that the center frequency of the cutoff band matches the mechanical resonance frequency. It is preferable not to obstruct the passage of the gain of the transfer function of the mechanical system of the control apparatus of a servo motor other than the mechanical resonance frequency as much as possible.

In this way, in the apparatus 10, the feedforward control unit divides the first speed command V1 into a filtered part V1f and a nonfiltered part V1nf and applies the above-mentioned filter for suppressing vibration due to mechanical resonance of the working unit 30 to only the filtered part V1f.

On the other hand, the second position control unit 11b receives as input the positional difference P-p output from the first subtracting unit 17a and outputs the second speed command V2 to the filtering unit 14. The second position control unit 11b will be explained further below.

First, the position command P output from the higher control unit 20 is input to the first subtracting unit 17a. This first subtracting unit 17a further receives as input the position detection value p of the servo motor output from the position detection unit 31. Further, the first subtracting unit 17a subtracts the position detection value p from the position command P to obtain the positional difference P-p and outputs this positional difference P-p to the second position control unit 11b.

The second position control unit 11b receives as input the positional difference P-P output from the first subtracting unit 17a and outputs a second speed command V2 to the filtering unit 14 so that the feedback control unit stabilizes, that is, so as to reduce this positional difference. Specifically, the second position control unit 11b of the apparatus 10 has a proportional control unit. This proportional control unit multiplies the positional difference P-p with a second processing constant to find the second speed command V2.

The second speed command V2 includes a frequency component of vibration due to mechanical resonance when mechanical resonance occurs at the working unit 30.

The filtering unit 14, in the same way as the above, removes the mechanical resonance frequency component from the input second speed command V2. In this way, in the apparatus 10, the second speed command V2 is also filtered to suppress vibration due to the mechanical resonance of the working unit 30.

The filtering unit 14 outputs the filtered part V1f of the first speed command V1 which is filtered and the second speed command V2 to the adder unit 15. Further, the adder unit 15 receives as input the nonfiltered part V1nf of the first speed command V1 from the distributing unit 13.

The adder unit 15 adds the filtered part V1f and the nonfiltered part V1nf of the first speed command V1 and the second speed command V2 to obtain the speed command V and outputs this speed command V to the second subtracting unit 17b.

The speed command V output from the adder unit 15 is input to the second subtracting unit 17b. This second subtracting unit 17b further receives as input the speed detection value v of the servo motor output from the speed detecting unit 32. Further, the second subtracting unit 17b subtracts the speed detection value v from the speed command V to obtain the speed difference V-v and outputs this speed difference V-v to the speed control unit 12.

The speed control unit 12 receives as input the speed difference V-v output from the second subtracting unit 17b and outputs a control command to the working unit 30 so that the feedback control unit stabilizes, that is, this speed difference is reduced. Specifically, the speed control unit 12 of the apparatus 10 has a proportional control unit and an integrating control unit and outputs current commands and other commands for controlling the servo motor 33 to the working unit 30.

Next, the positional control of the servo motor 33 of the apparatus 10 having the above-mentioned configuration and the operation for suppression of vibration due to mechanical resonance will be explained further below. The apparatus 10 has a feedforward control unit and a feedback control unit. In the feedforward control unit, a position command P from the higher control unit 20 is input to the first position control unit 11a and a first speed command V1 is output to the speed control unit 12. Due to this, positional control of the servo motor 33 with a good response to a position command P can be performed, so the positional precision of the servo motor 33 becomes higher, and therefore high precision work results can be obtained at the working unit 30. By providing the filtering unit 14 at this high positional precision feedforward control unit, vibration due to the mechanical resonance of the working unit 30 is effectively suppressed. Further, in the apparatus 10, the first speed command V1 of the feedforward control unit is divided by the distributing unit 13 into the filtered part V1$f$ and the nonfiltered part V1$nf$ and only the filtered part V1$f$ is filtered by the filtering unit 14. Due to this, the speed commands required for acceleration or deceleration of the servo motor 33 secure the state sufficiently output to the servo motor 33, maintain the positional precision of the servo motor 33, and suppresses vibration due to mechanical resonance.

Further, in the feedback control unit of the apparatus 10, the position detection value p is fed back and the position of the servo motor 33 is controlled with a high precision. When mechanical resonance occurs in the working unit 30, the second speed command V2 of the feedback control unit includes the frequency component of the vibration due to that mechanical resonance, so this second speed command V2 is also filtered by the filtering unit 14 to suppress vibration due to mechanical resonance.

The above-mentioned apparatus 10 suppresses the mechanical resonance due to low frequency vibration of the working unit 30 and has a superior control precision of the servo motor 33. Further, the apparatus 10 uses a filtering unit 14 having a bandstop filter to suppress vibration due to low frequency mechanical resonance, so the invention is not limited by this mechanical resonance frequency, the frequency band of the gain of the transfer function of the apparatus 10 can be broadened, and the dynamic characteristics of the working unit 40 can be improved.

Figure 5:
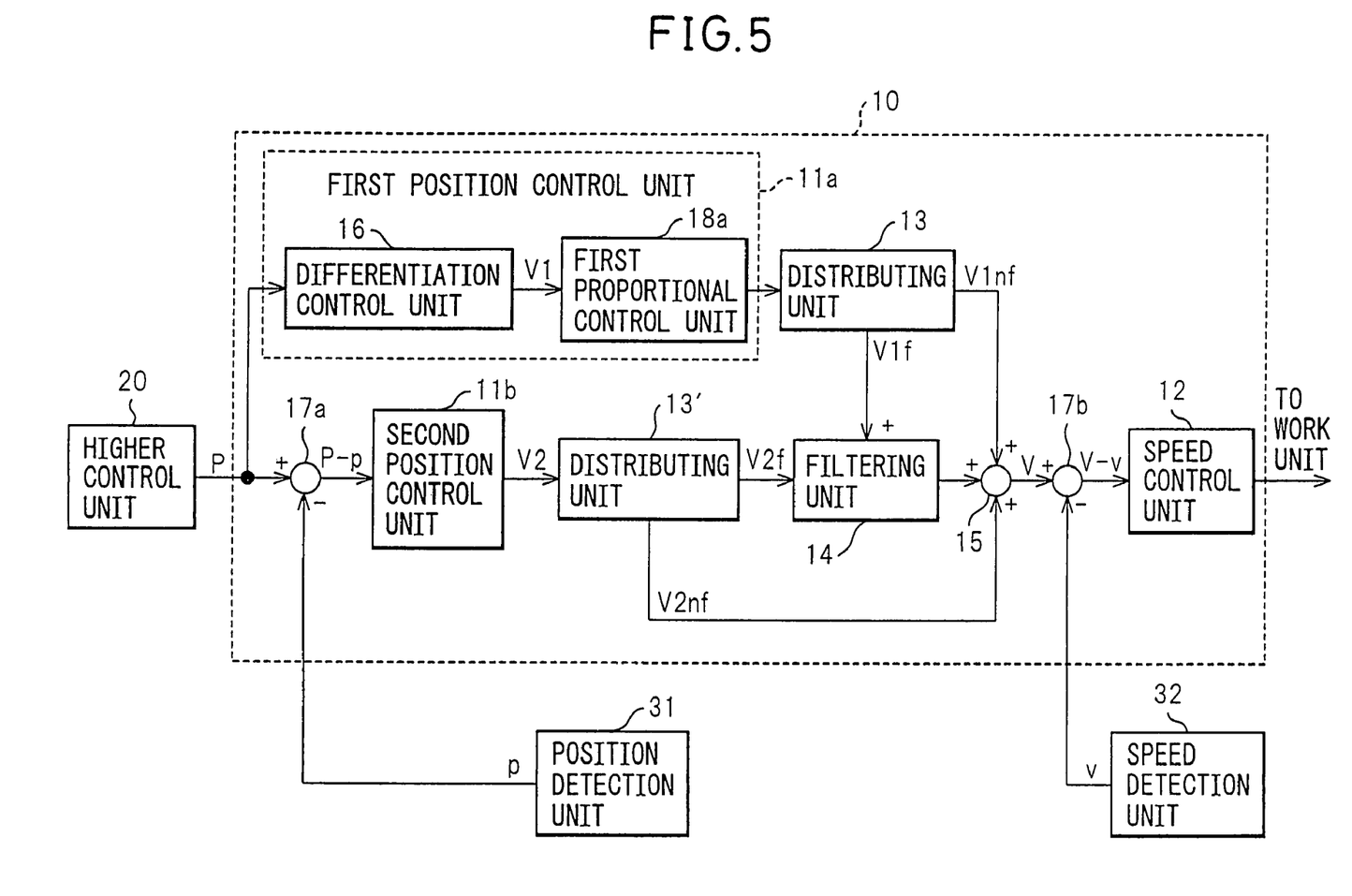
FIG. 5 is a block diagram showing a modification of the embodiment shown in FIG. 2.

Next, a modification 1 of the above-mentioned first embodiment will be explained with reference to FIG. 5. The modification 1 of the first embodiment, as shown in FIG. 5, differs from the first embodiment in that a distributing unit 13' is inserted between the second position control unit 11$b$ and the filtering unit 14.

The second speed command V2 output from the second position control unit 11$b$ is input to the distributing unit 13'. The distributing unit 13' receives as input the second speed command V2 output from the second position control unit 11$b$ and divides this second speed command V2 into a filtered part V2$f$ to be filtered to suppress vibration due to the mechanical resonance of the working unit 30 and the nonfiltered part V2$nf$ not to be filtered.

The filtered part V2$f$ output from the distributing unit 13' is input to the filtering unit 14. The nonfiltered part V2$nf$ output from the distributing unit 13' is input to the adder unit 15.

The distributing unit 13' used may be similar to the distributing unit 13 of the above-mentioned first embodiment. In this case, the value of the third processing constant k may be the same or different in the distributing unit 13'.

According to the above-mentioned modification 1, by setting a nonfiltered part V2$nf$ for the second speed command V2 as well, the positional precision of the servo motor 33 can be further enhanced.

Figure 6:
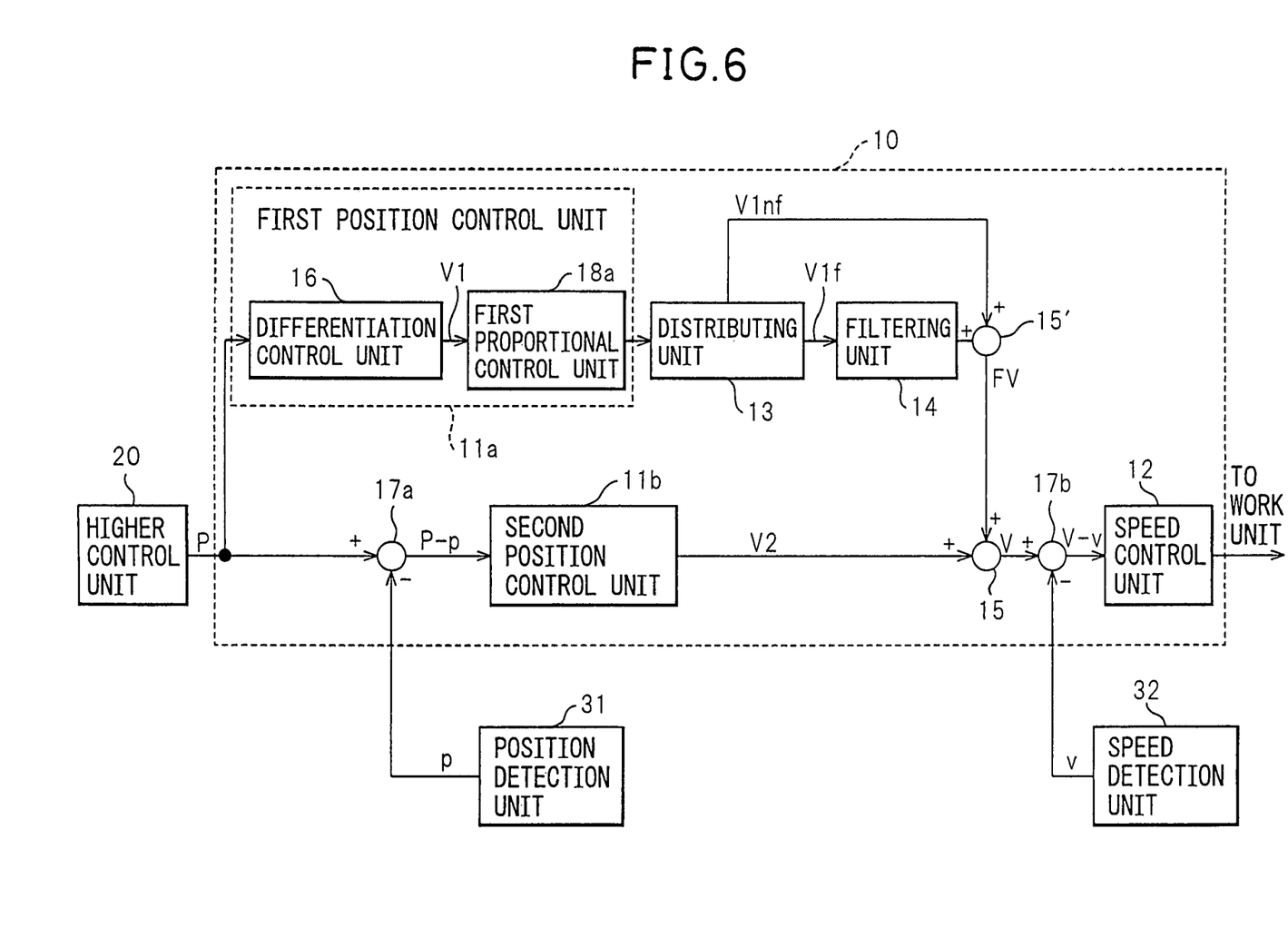
FIG. 6 is a block diagram showing another modification of the embodiment shown in FIG. 2.

Next, a modification 2 of the above-mentioned first embodiment will be explained with reference to FIG. 6. The modification 2 of the first embodiment, as shown in FIG. 6, does not have a filtering unit between the second position control unit 11$b$ and the adder unit 15. The second position control unit 11$b$ and the adder unit 15 are directly connected. Further, the filtering unit 14 moves from the feedback control unit side to the feedforward control unit side. This point differs from the first embodiment.

The second speed command V2 output from the second position control unit 11$b$ of the modification 2 is directly input to the adder unit 15. The filtered part V1$f$ output from the distributing unit 13 of the feedforward control unit of the modification 2 is input to the filtering unit 14, while the filtered part V1$f$ which is filtered is output to the adder unit 15'. Further, the nonfiltered part V1$nf$ output from the distributing unit 13 is also output to the adder unit 15'. The adder unit 15' adds the filtered part V1$f$ and the nonfiltered part V1$nf$ and outputs the result to the adder unit 15.

According to the above-mentioned modification 2, the second speed command V2 is not filtered, so the positional precision of the servo motor 33 can be further enhanced. The position of the servo motor 33 is mainly controlled by the feedforward control unit. If filtering the first speed command V1 of the feedforward control unit according to the work content or operation of the working unit 30, vibration due to the mechanical resonance of the working unit 30 can be sufficiently suppressed.

Next, the control apparatus of a servo motor of another embodiment of the present invention will be explained below with reference to FIG. 7 to FIG. 11. For the points not particularly explained for this other embodiment, the detailed explanations relating to the above-mentioned first embodiment may be suitably applied. Further, in FIG. 7 to FIG. 11, components the same as in FIG. 1 to FIG. 6 are assigned the same reference notations.

Second Embodiment

The control apparatus 10 of a servo motor of a preferred second embodiment of the present invention will be explained below with reference to FIG. 7. The difference from the above-mentioned first embodiment is that the control apparatus 10 of a servo motor of the present embodiment (hereinafter also referred to simply as the "apparatus 10") has a changing unit 19$a$ for changing the third processing constant k.

The changing unit 19$a$ changes the value of the third processing constant k at the distributing unit 13 in accordance with the operation of the working unit 30 and the position command P etc. and thereby changes the ratio of application of the filter to the first speed command V1. Due to this, vibration due to the mechanical resonance of the working unit 30 is suppressed, and the precision of positional control of the servo motor 33 is enhanced.

Specifically, the changing unit 19$a$ of the apparatus 10 changes the value of the third processing constant k according to the value of the maximum acceleration AccMAX applied to the working unit 30. This maximum acceleration AccMAX is for example the maximum acceleration applied to the driven part driven by the servo motor 33, that is, the work section 34. In this way, in the apparatus 10, the third processing constant k is changed by the changing unit 19$a$ in accordance with the maximum acceleration AccMAX at the time of acceleration/deceleration due to the position command P.

The operation of the working unit 30 is controlled by the position command P of the higher control unit 20. This position command P is found in the higher control unit 20 by calculation by a CPU based on for example a numerical control program using a computer. This numerical control program is set with the maximum acceleration AccMAX in the operation of the working unit 30 as a parameter.

On the other hand, the minimum value Acc0 of the acceleration at which vibration due to mechanical resonance occurs at the working unit 30 due to the rigidity, elasticity, attenuation characteristics, etc. of the servo motor 33, work section 34, and other mechanical components of this working unit 30 is found. This Acc0 is a reference value of the acceleration judged when mechanical resonance occurs when an acceleration over this is applied to the working unit 30. This reference value Acc0 is set as a parameter in the changing unit 19a, specifically the later mentioned maximum acceleration judging unit 40.

Figure 7:
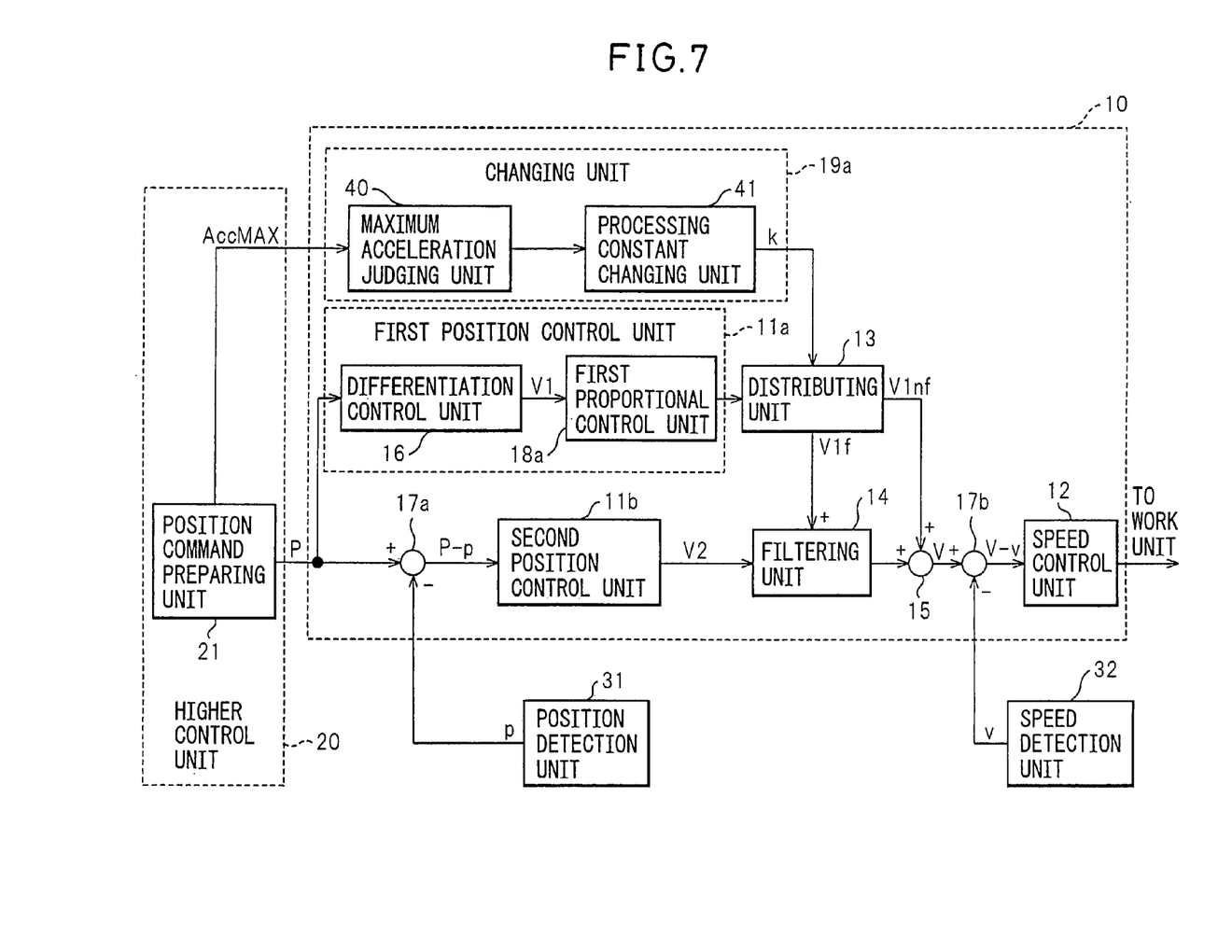
FIG. 7 is a block diagram showing principal parts of a control apparatus of a servo motor of a second embodiment of the present invention.

The higher control unit 20, as shown in FIG. 7, has a position command preparing unit 21 preparing a position command P. This position command preparing unit 21 outputs a position command P. The position command preparing unit 21 further outputs the maximum acceleration AccMAX set at the above-mentioned numerical control program to the changing unit 19a.

The changing unit 19a of the apparatus 10 is, as shown in FIG. 7, comprised of a maximum acceleration judging unit 40 and a processing constant changing unit 41. The maximum acceleration judging unit 40 receives as input the maximum acceleration AccMAX output from the position command preparing unit 21, judges the relative magnitude of this maximum acceleration AccMAX and the reference value Acc0, and outputs the result of judgment to the processing constant changing unit 41.

The processing constant changing unit 41 receives as input the result of judgment output from the maximum acceleration judging unit 40, finds the third processing constant k based on this result of judgment, and outputs the found third processing constant k to the distributing unit 13. The distributing unit 13 uses the input third processing constant k to determine the ratio of filtering the first speed command.

The operation of the changing unit 19a of the apparatus 10 will be explained in detail below using the example shown in FIG. 8a. The maximum acceleration judging unit 40 to which the maximum acceleration AccMAX output from the position command preparing unit 21 is input compares this maximum acceleration AccMAX and the set reference value Acc0 as a parameter (S10). As a result, when the maximum acceleration AccMAX is larger than the reference value Acc0, there is a possibility of vibration occurring due to mechanical resonance in the operation of the working unit 30, so the routine proceeds to S11 for determining the ratio of filtering the first speed command V1.

At S11, the difference of the maximum acceleration AccMAX and reference value Acc0 is multiplied by the fourth processing constant α, then this value is subtracted from "1" to find the variable tmp (S11). Further, the maximum acceleration judging unit 40 judges the relative magnitude of this variable tmp and zero and outputs the result of judgment to the processing constant changing unit 41 (S12).

The processing constant changing unit 41 sets the third processing constant k to the value of the variable tmp when the variable tmp is larger than zero and outputs this third processing constant k to the distributing unit 13 (S13).

Further, the processing constant changing unit 41 sets the value of the third processing constant k to zero when the variable tmp is zero or negative value since there is a possibility of a large vibration occurring due to mechanical resonance and outputs this third processing constant k to the distributing unit 13 (S14).

On the other hand, at S10, when the maximum acceleration AccMAX is the reference value Acc0 or less, there is no possibility of vibration occurring due to mechanical resonance in the operation of the working unit 30, so the result of judgment is output to the processing constant changing unit 41. The processing constant changing unit 41 sets the value of the third processing constant k to "1" so as not to filter the first speed command V1 and outputs this third processing constant k to the distributing unit 13 (S15).

The distributing unit 13 uses the third processing constant k output from the processing constant changing unit 41 to find the filtered part V1f and the nonfiltered part V1nf from the first speed command V1. The distributing unit 13 preferably performs the processing shown in FIG. 3.

According to the above-mentioned apparatus 10, the ratio of the filtered part V1f with respect to the first speed command V1 is set to exactly the required amount for suppressing vibration due to the mechanical resonance of the working unit 30 in accordance with the maximum acceleration AccMAX occurring in the working unit 30, so it is possible to suppress vibration due to the mechanical resonance of the working unit 30 and raise the precision of the positional control of the servo motor 33.

Next, the modification 1 of the above-mentioned second embodiment will be explained with reference to FIG. 8b. This modification 1, as shown in FIG. 8b, differs from the second embodiment in the method of finding the third processing constant k in the changing unit 19a.

The operation of the changing unit 19b of the modification 1 of the second embodiment will be explained below. The maximum acceleration judging unit 40 to which the maximum acceleration AccMAX output from the position command preparing unit 21 is input compares the relative magnitude of the maximum acceleration AccMAX and the reference value Acc0 set as a parameter. As a result, when the maximum acceleration AccMAX is larger than a reference value Acc0, vibration due to mechanical resonance may occur in the operation of the working unit 30, so the result of judgment is output to the processing constant changing unit 41 to determine the ratio of filtering the first speed command V1 (S20).

The processing constant changing unit 41 has the function F (AccMAX-Acc0) of linking the difference between the maximum acceleration AccMAX and reference value Acc0 with the third processing constant k. The processing constant changing unit 41 uses this function to find the value of the third processing constant k and outputs this third processing constant k to the distributing unit 13 (S21). The function F (AccMAX-Acc0), for example, can obtain the relationship of the difference between the maximum acceleration AccMAX and the reference value Acc0 with the third processing constant k as a linear relationship, curved relationship, stepped relationship, etc. in accordance with the mechanical components of the working unit 30.

On the other hand, at S20, when the maximum acceleration AccMAX is the reference value Acc0 or less, there is no possibility of vibration occurring due to mechanical resonance in the operation of the working unit 30, so the maximum acceleration judging unit 40 outputs the results of judgment to the processing constant changing unit 41. The processing constant changing unit 41 sets the value of the third processing constant k to "1" so that the first speed command V1 is not filtered and outputs this third processing constant k to the distributing unit 13 (S22). The rest of the operation of the changing unit 19b of the modification 1 is similar to that of the second embodiment.

According to the above-mentioned modification 1, even when the relationship of the difference between maximum acceleration AccMAX and reference value Acc0 with the third processing constant k is not a linear relationship like in the second embodiment, the changing unit 19a may be used to set a suitable value of the third processing constant k.

Next, the modification 2 of the above-mentioned second embodiment will be explained below with reference to FIG. 8c. This modification 2, as shown in FIG. 8c, differs from the second embodiment in the operation of the changing unit 19a. Specifically, the processing of the processing constant changing unit 41 differs.

The processing constant changing unit 41 of the modification 2 has a table Tbl (AccMAX-Acc0) linking the differences between the maximum acceleration AccMAX and reference value Acc0 and the third processing constant k. It uses this table to find the value of the third processing constant k and outputs this third processing constant k to the distributing unit 13 (S21').

The table Tbl (AccMAX-Acc0) may be prepared, for example, using an algebraic equation of the changing unit 19a of the second embodiment or a function of the changing unit 19b of the above-mentioned modification 1. By preparing a table of the relationship of the difference between the maximum acceleration AccMAX and reference value Acc0 with the third processing constant k in this way, it is possible to reduce the processing time of the changing unit 19c.

Further, in the above-mentioned second embodiment and its modifications 1 and 2, the third processing constant k is changed by the changing unit in accordance with the maximum acceleration AccMAX at the time of acceleration/deceleration by the position command P, but the third processing constant k may also be changed in accordance with the acceleration/deceleration time constant applied in acceleration/deceleration by the position command P.

Figure 9:
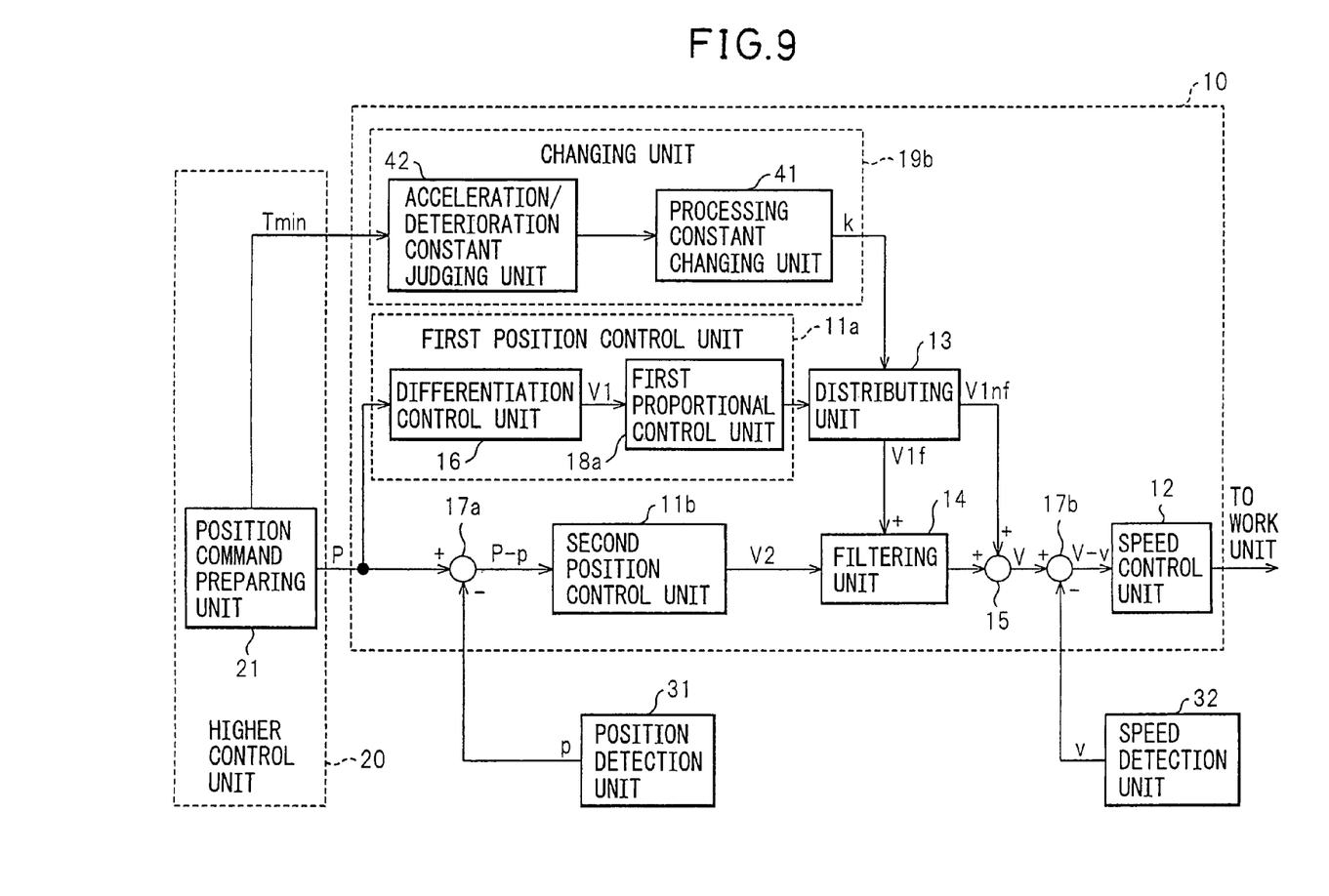
FIG. 9 is a block diagram showing a modification of the embodiment shown in FIG. 7.

This acceleration/deceleration time constant is generally inversely proportional to the acceleration. Therefore, it is possible to use the maximum acceleration AccMAX to find the minimum acceleration/deceleration time constant Tmin. Therefore, it is possible to set the minimum acceleration/deceleration constant Tmin in the above-mentioned numerical control program of use the numerical control program to find the minimum acceleration/deceleration time constant Tmin from the maximum acceleration AccMAX. Further, as shown in FIG. 9, it is possible to have the position command preparing unit 21 output the minimum acceleration/deceleration time constant Tmin to the acceleration/deceleration time constant judging unit 42 of the changing unit 19b and process this in the same way as the second embodiment to change the third processing constant k.

Third Embodiment

Next, the control apparatus 10 of a servo motor of a preferred third embodiment of the present invention will be explained below with reference to FIG. 10. The point of difference from the above-mentioned second embodiment is that the changing unit 19c of the control apparatus 10 of a servo motor of the present embodiment (hereinafter also referred to simply as the "apparatus 10") changes the third processing constant k depending on the feed type of the work section 34 of the working unit 30.

In the apparatus 10, the third processing constant k is switched by the changing unit 19c when the position command P instructs working by the work section 34 of the working unit 30 and when it instructs only movement of the work section 34 of the working unit 30 without being accompanied with working.

Figure 10:
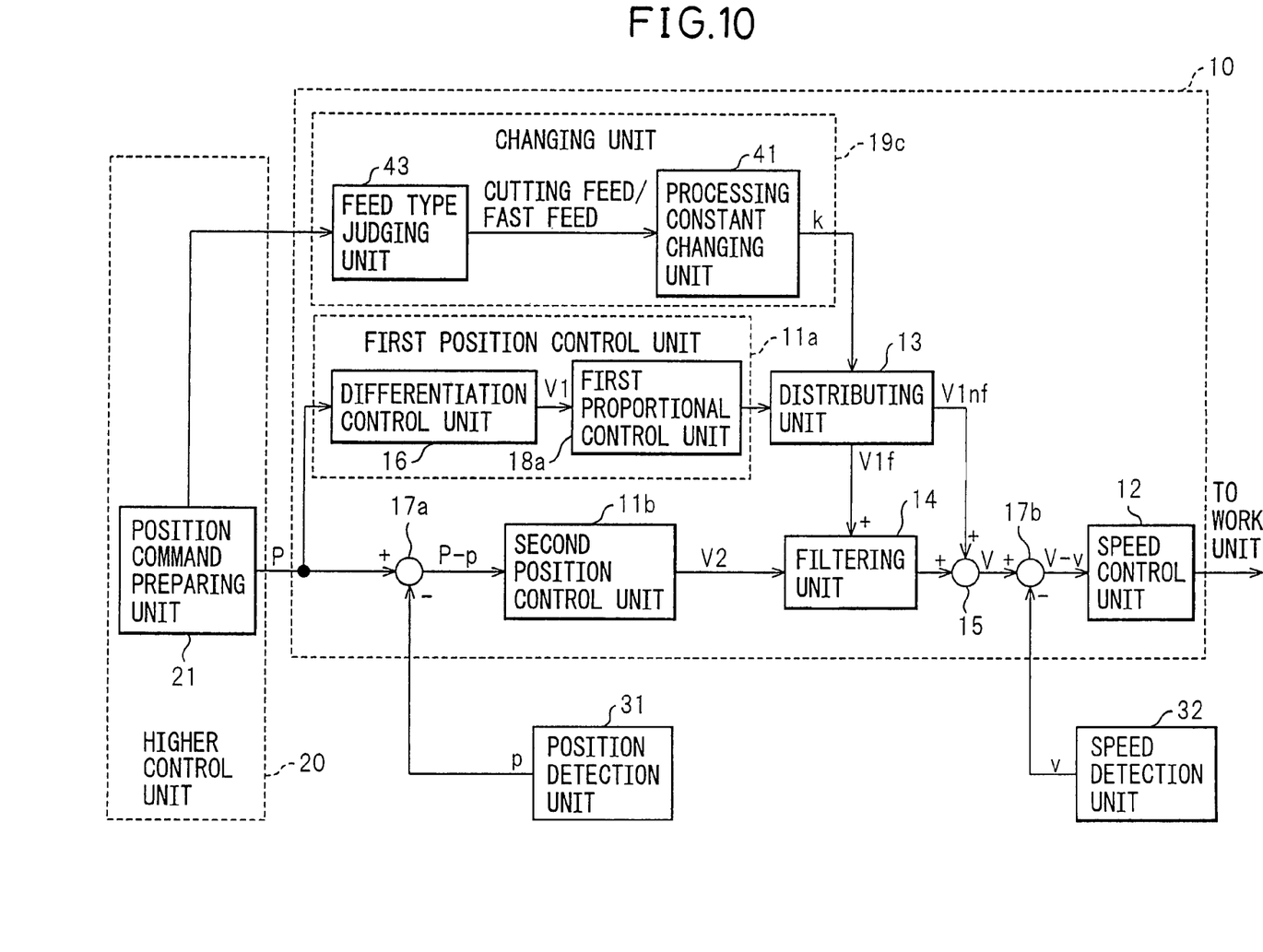
FIG. 10 is a block diagram showing principal parts of a control apparatus of a servo motor of a third embodiment of the present invention.

The position command preparing unit 21 of the higher control unit 20, as shown in FIG. 10, outputs the feed type of the work section 34 of the working unit 30 to the changing unit 19c. The feed types of this work section 34, for example, include an operation where the work section 34 is fed by a feed shaft along with cutting or other working or an operation where the work section 34 is fed fast by a feed shaft for simple movement without being accompanied with working.

The changing unit 19c of the apparatus 10, as shown in FIG. 10, is comprised of a feed type judging unit 43 and a processing constant changing unit 41. The feed type judging unit 43 receives as input the feed type of the work section 34 output from the position command preparing unit 21, judges this feed type, and outputs the result of judgment to the processing constant changing unit 41. The judgment performed by this feed type judging unit 43, as explained above, is made from the viewpoint of whether the feed type is accompanied with working or not accompanied with working.

The operation of the changing unit 19c of the apparatus 10 will be explained below using the example shown in FIG. 10 and FIG. 11a. First, in the apparatus 10, the operation of the work section 34 by the position command P may be roughly divided into cutting feed accompanied with working and fast feed not accompanied with working. Therefore, the feed type output by the position command preparing unit 21 to the feed type judging unit 43 is cutting feed or fast feed.

Figure 11A:
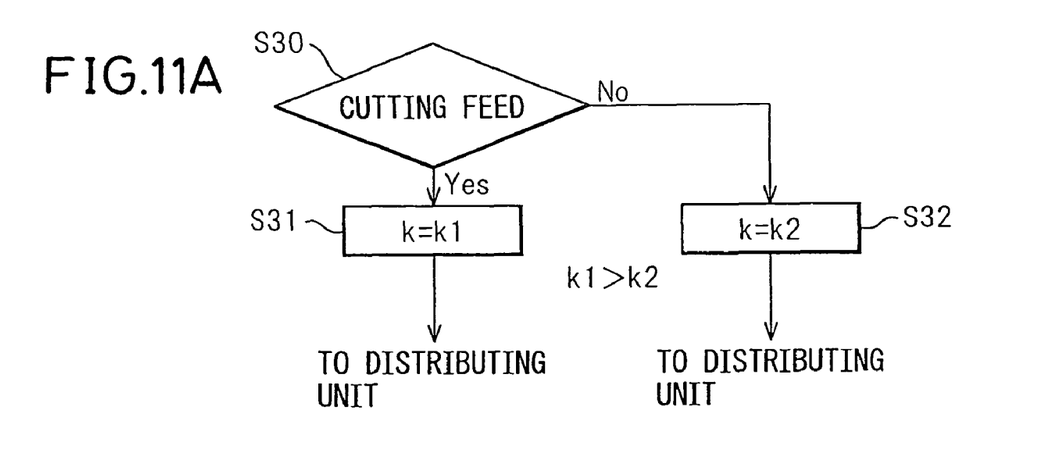
FIG. 11A is a flow chart for explaining a changing unit of the embodiment shown in FIG. 10.

The feed type judging unit 43 receives as input the feed type output from the position command preparing unit 21 and, as shown in FIG. 11a, judges this feed type, that is, if it is cutting feed or fast feed, and outputs the result of judgment to the processing constant changing unit 41 (S30).

The processing constant changing unit 41 sets k1 to the value of the third processing constant k when the feed type input from the feed type judging unit 43 is the cutting feed and outputs this third processing constant k to the distributing unit 13 (S31). On the other hand, the processing constant changing unit 41 sets k2 for the value of the third processing constant k when the feed type input from the feed type judging unit 43 is fast feed and outputs this third processing constant k to the distributing unit 13 (S32).

Here, in the case of fast feed generally not accompanied with working, a high precision is not required for the positional control of the servo motor 33, so it is possible to raise the ratio of the filtered part V1f with respect to the first speed command V1 to increase the feed speed of the work section 34. On the other hand, when performing working where a high work precision of the work section 34 is sought, a high precision in the positional control of the servo motor 33 becomes necessary, so it is possible to lower the ratio of the filtered part V1f with respect to the first speed command V1 to increase the work precision of the work section 34. Therefore, the value of the third processing constant k is preferably in the relationship of k1>k2.

Further, even with a feed operation accompanied with working, in the initial working, sometimes a high precision is not required for positional control of the servo motor 33. In such a case, it is possible to raise the ratio of the filtered part V1f with respect to the first speed command V1 so as to increase the feed speed of the work section 34. Further, preferably the feed type judging unit 43 makes the judgment adding the category of cutting feed accompanied with initial working to the feed types.

According to the above-mentioned apparatus 10, the third processing constant k is changed in accordance with the feed operation of the work section 34 of the working unit 30, so both a high speed and high precision of the working unit 30 can be achieved.

Figure 11B:
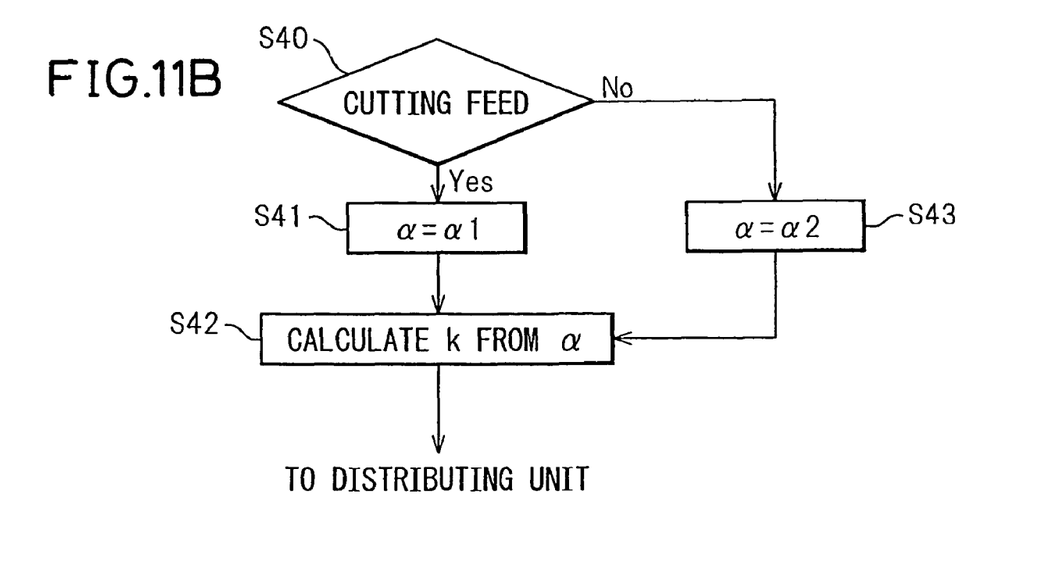
FIG. 11B is a flow chart showing a modification of FIG. 11A.

Next, a modification of the above-mentioned third embodiment will be explained with reference to FIG. 11b. This modification, as shown in FIG. 11b, differs from the third embodiment in the operation of the changing unit 19a. Specifically, the processing of the processing constant changing unit 41 differs.

The feed type judging unit 43 receives as input the feed type output from the position command preparing unit 21, judges this feed type, that is, if it is cutting feed or fast feed, and outputs the result of judgment to the processing constant changing unit 41 (S40).

The processing constant changing unit 41 sets the parameter α1 for the variable α when the feed type input from the feed type judging unit 43 is cutting feed (S41). Next, the processing constant changing unit 41 finds the third processing constant k from this variable α and outputs this third processing constant k to the distributing unit 13 (S42).

On the other hand, the processing constant changing unit 41 sets the parameter α2 for the variable a when the feed type input from the feed type judging unit 43 is fast feed (S43). Next, the processing constant changing unit 41 finds the third processing constant k from this variable α and outputs this third processing constant k to the distributing unit 13 (S42).

Figure 8A:
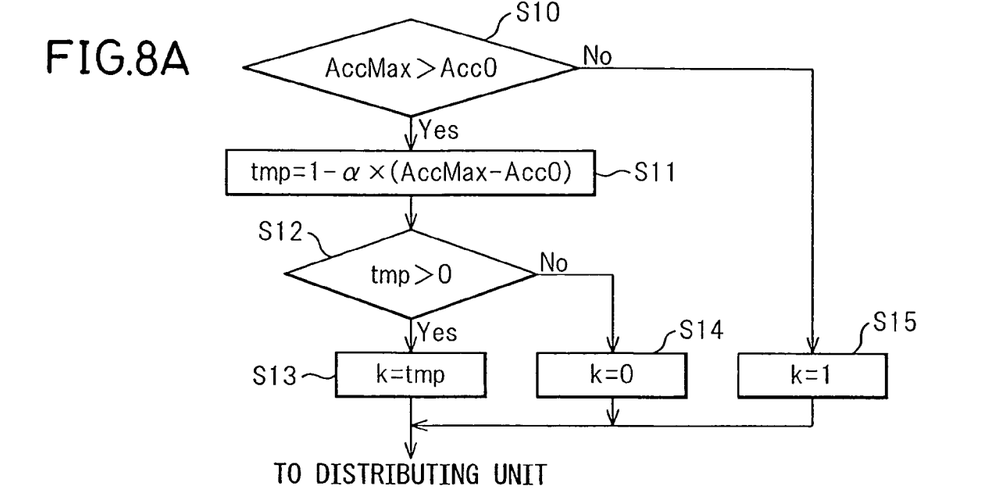
FIG. 8A is a flow chart for explaining a changing unit of the embodiment shown in FIG. 7.
Figure 8B:
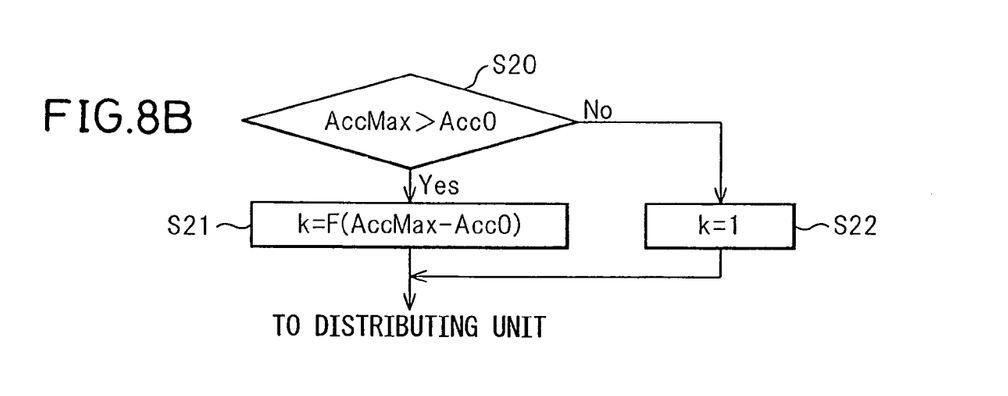
FIG. 8B is a flow chart showing a modification of FIG. 8A.
Figure 8C:
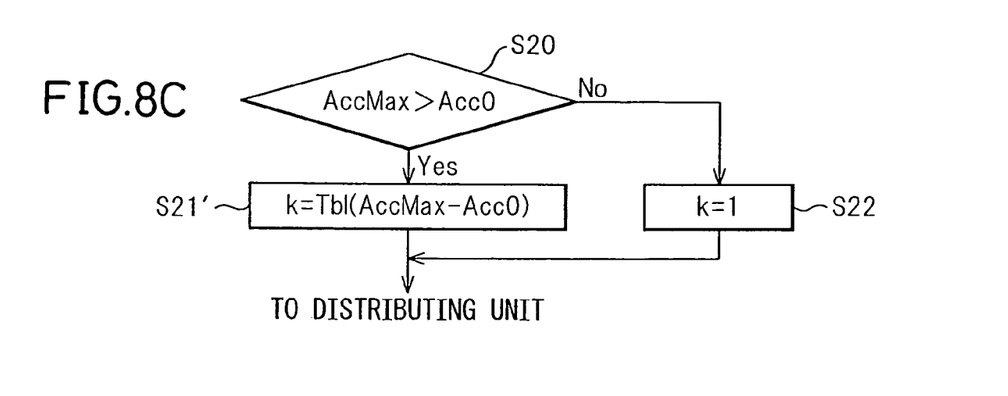
FIG. 8C is a flow chart showing another modification of FIG. 8A.

Here, as the method for finding the third processing constant k from the variable α at S42, for example, the method as shown in FIG. 8a to FIG. 8c can be used. The parameters α1 and α2 can be set as follows: First, when using the parameter α1, the feed type is cutting feed, so the processing constant changing unit 41 sets the value of α1 by which the third processing constant k is determined so that the ratio of the filtered part V1 to the first speed command V1 becomes higher. On the other hand, when using the parameter α2, the feed type is fast-forward, so the processing constant changing unit 41 preferably sets the value of α2 by which the third processing constant k is determined so that the ratio of the filtered part V1 to the first speed command V1 becomes lower.

According to the above-mentioned modification, it is possible to flexibly set various third processing constants k in order to realize a high speed and high precision of operation of the working feed type.

Further, in the above-mentioned third embodiment and its modifications, the third processing constant k was switched by the changing unit 19c depending on the feed type by the position command P, but the filter constant g of the filtering unit 14 may also be switched by the changing unit depending on the feed type.

The control apparatus of a servo motor of the present invention is not limited to the above-mentioned embodiments and their modifications and can be suitably modified so long as not deviating from the gist of the present invention. For example, in the above-mentioned second embodiment of the control apparatus of a servo motor of the present invention, the processing constant changing unit 41 changed the third processing constant k, but this processing constant changing unit 41 may also change the filter constant g of the filtering unit 14. In this way, the filter constant g is preferably changed by the changing unit in accordance with the maximum acceleration AccMAX of acceleration/deceleration due to the position command P or minimum time constant Tmin of acceleration/deceleration applied by acceleration/deceleration.

Further, the changing units of the above-mentioned second embodiment and third embodiment may be applied to the distributing unit 13' of the modification 1 of the first embodiment shown in FIG. 5.

Furthermore, in the above-mentioned embodiments, the position of the servo motor sometime includes the position of a mechanical component in the working unit 30 driven by this servo motor. The speed of the servo motor sometimes includes the speed of this mechanical component.

The parts which only single embodiments explained above have may all be suitably applied to the other embodiments as well.

What is claimed is:

1. A control apparatus of a servo motor comprising:
   a position control unit for controlling a position of a servo motor;
   a speed control unit for controlling a speed of the servo motor;
   a distributing unit for dividing a speed command output by said position control unit into a filtered part to be filtered for suppressing vibration and a nonfiltered part;
   a filtering unit for receiving as input said filtered part and filtering and outputting said filtered part; and
   an adder unit for adding said filtered part filtered by said filtering unit and said nonfiltered part and outputting the result to said speed control unit.

2. The control apparatus of a servo motor as set forth in claim 1, further comprising a higher control unit for outputting a position command and a position detection unit for detecting the position of said servo motor and outputting the position detection value, wherein
   said position control unit includes a first position control unit and a second position control unit,
   a first speed command found in accordance with a differential value of said position command is output from said first position control unit to which said position command is input to said distributing unit,
   a second speed command is output from said second position control unit to which a positional difference obtained from said position command and said position detection value is input, and
   said adder unit adds the filtered part of said first speed command filtered by said filtering unit and the nonfiltered part of said first speed command together with said second speed command and outputs the result to said speed control unit.

3. The control apparatus of a servo motor as set forth in claim 2, wherein said second speed command is filtered by said filtering unit.

4. The control apparatus of a servo motor as set forth in claim 2, wherein said first speed command is said differential value of said position command multiplied with a first processing constant and said second speed command is said positional difference multiplied with a second processing constant.

5. The control apparatus of a servo motor as set forth in claim 2, wherein said nonfiltered part is said first speed command multiplied with a third processing constant k and said filtered part is said first speed command multiplied by (1−k).

6. The control apparatus of a servo motor as set forth in claim 5, wherein said filtering unit can change an input/output gain without changing the frequency band by changing a filter constant of said filter.

7. The control apparatus of a servo motor as set forth in claim 6, wherein said filter is a bandstop filter.

8. The control apparatus of a servo motor as set forth in claim 6, further comprising a changing unit for changing said third processing constant or said filter constant.

9. The control apparatus of a servo motor as set forth in claim 8, wherein said third processing constant or said filter constant is changed by said changing unit in accordance with a maximum acceleration at the time of acceleration/deceleration by said position command or an acceleration/deceleration time constant applied by acceleration/deceleration.

10. The control apparatus of a servo motor as set forth in claim 8, further comprising a working unit driven by the servo motor and said third processing constant is switched by said changing unit when said position command instructs working by said working unit and when it instructs movement of said working unit not accompanied by working.

11. The control apparatus of a servo motor as set forth in claim 8, further comprising a working unit driven by the servo motor and said filter constant is switched by said changing unit when said position command instructs working by said working unit and when it instructs movement of said working unit not accompanied by working.

* * * * *